Feb. 24, 1942.  A. T. WILLIAMS  2,274,441

EXPOSURE METER

Filed Jan. 14, 1939

Inventor:
Alexander T. Williams,
By Potter, Pierce & Scheffler,
Attorneys.

Patented Feb. 24, 1942

2,274,441

UNITED STATES PATENT OFFICE 2,274,441

EXPOSURE METER

Alexander T. Williams, Newark, N. J., assignor to Weston Electrical Instrument Corporation, Newark, N. J., a corporation of New Jersey Application January 14, 1939, Serial No. 251,005

20 Claims. (Cl. 88—23)

This invention relates to photometers and more particularly to photometers or brightness meters such as are used to determine exposure data for photographic purposes.

The invention is not restricted to but is particularly useful with exposure meters of the photoelectric type. Such devices usually include a barrier layer or current generating photoelectric cell, a sensitive milliammeter and some form of baffle system for limiting the angular spread of the light rays reaching the photoelectric cell. A single instrument for measuring brightness must cover the long range of values which corresponds to such extreme conditions as, for example, landscapes with snow covering the ground, or seashore scenes and scenes or portraits within rooms having dark furnishings. The current output of the photocell is relatively small under the best conditions and it is therefore obvious that great difficulty has been experienced in designing an exposure meter capable of measuring large values and of such sensitivity as to provide readable indications within the lower ranges of brightness values. The use of double range ammeters has been proposed as a solution of this problem of obtaining significant indications at the low end of a long range of brightness values, and it has also been proposed to use diaphragms or "stops" for blocking off a fraction of the light rays that approach the exposure meter from the scene to be photographed.

According to the present invention, a single-range ammeter of high sensitivity is used in the photometer, and a double range of operation is obtained by controlling the acceptance angle of the photocell, i. e. the angular spread of the light rays that reach the photocell. It has been the accepted view that the acceptance angle of an exposure meter should be approximately the same as the image angle of the camera. The measurements thus obtained with prior exposure meters have been measurements of the average brightness of the particular scene and, where there is considerable variation in the brightness of the scene, a correction must be made to obtain the exposure data that is appropriate for the dominant feature or features of the scene.

The present invention is based on my recognition of the fact that when photographs are taken indoors or in other relatively dark places such as in the shade of trees wtih low sunlight or in poorly lighted interiors it is usually possible to approach the subject close enough to obtain a true brightness reading of the principal part of the scene or object over an acceptance angle much larger than the image angle of a camera. Conversely, in the case of relatively high brightness such as a scene from the peak of a mountain or a boat upon the water it is usually impossible to approach the principal object close enough to obtain a true brightness reading and for this reason the acceptance angle should be considerably smaller than the image angle of a camera. I have therefore found that it is practical to determine exposure data for photographic purposes by measuring brightness values of the scene over acceptance angles that may be substantially larger or substantially smaller (according to the absolute brightness of the scene) than the average camera image angle.

An object of this invention is to provide a photometer or brightness measuring instrument which includes elements for adjusting the acceptance angle of the light rays admitted to the measuring system. An object is to provide a photometer having one baffle system with a relatively large acceptance angle in order to obtain high sensitivity to low brightness values and another baffle system for restricting the acceptance angle to a smaller value where high sensitivity is not required due to the higher brightness values encountered. Another object is to provide an exposure meter including a range-changing member in the form of an auxiliary baffle. More particularly, an object is to provide an exposure meter having a baffle system including a permanently operative section for admitting light rays to the photosensitive element over a large acceptance angle, and an adjustable section that may be combined with the first baffle section to reduce the acceptance angle to a much lower value. Another object is to provide an exposure meter including a measuring instrument having a plurality of scales of brightness values, a photoelectric cell, a light-restricting baffle adjustable to vary the light energy reaching the cell, thereby to alter the measuring range of the instrument, and a device operable simultaneously with or by the adjustable baffle to expose to view only the range scale that is appropriate for the particular baffle adjustment.

These and other objects and advantages of the invention will be apparent from the following specification when taken with the accompanying drawing, in which.

Figure 1:
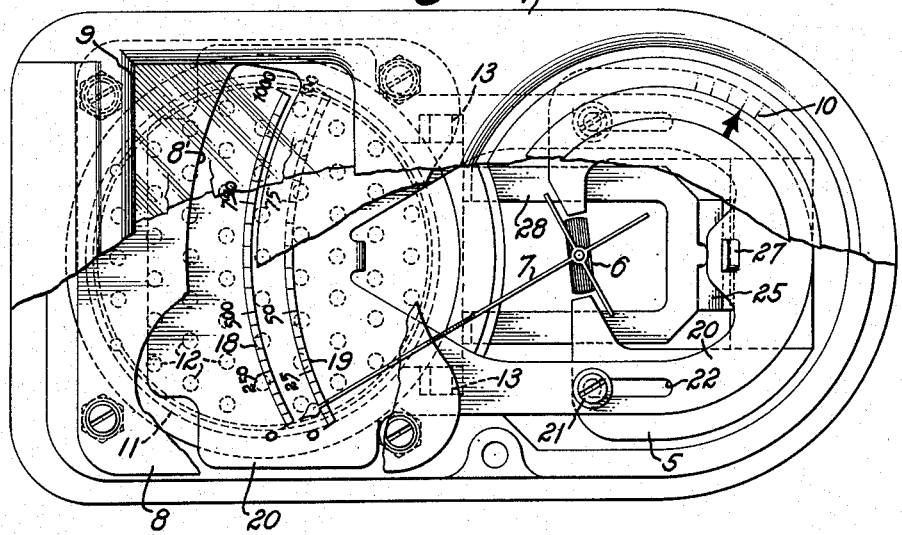
Fig. 1 is a plan view, with parts broken away, of an embodiment of the invention.

In the drawing, the reference numeral 1 identifies the relatively flat and elongated rectangular casing which houses a barrier layer type photoelectric cell 2, a main or permanently operative light-restricting system comprising a multiple lens plate 3 and multiple compartment member 4, such as described and claimed in the patent to Hans F. Tönnies, 2,067,843, and a measuring instrument comprising a permanent magnet 5, moving coil 6 and pointer 7. The pointer 7 moves over a plate 8 that is exposed to view through a window 9 in one of the large flat walls of the casing 1, and the measured values of brightness are evaluated with other exposure factors by means of a multiple disk computer 10 that is mounted adjacent the window opening 9.

Exposure meters including the elements so far described are disclosed and claimed in the patent to William N. Goodwin, Jr., No. 2,073,790, and reference is made to the same for a more detailed description of the construction and the function of the computer. The present invention is not restricted, however, to exposure meters of the type in which brightness values are read from the instrument and introduced into the computer.

In accordance with this invention, an auxiliary baffle member is provided for use with the main baffle members 3, 4, when desired, to reduce the light energy reaching the photocell 2, thereby altering the brightness range of the instrument, and a graduated scale plate is automatically displaced to expose to view only that single scale of graduations which is appropriate for the adjustment of the auxiliary baffle.

Figure 2:
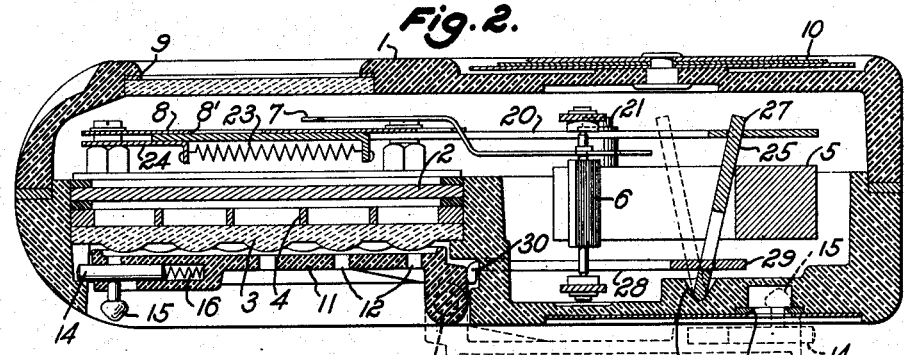
Fig. 2 is a side elevation, with certain of the parts shown in longitudinal section.
Figure 3:
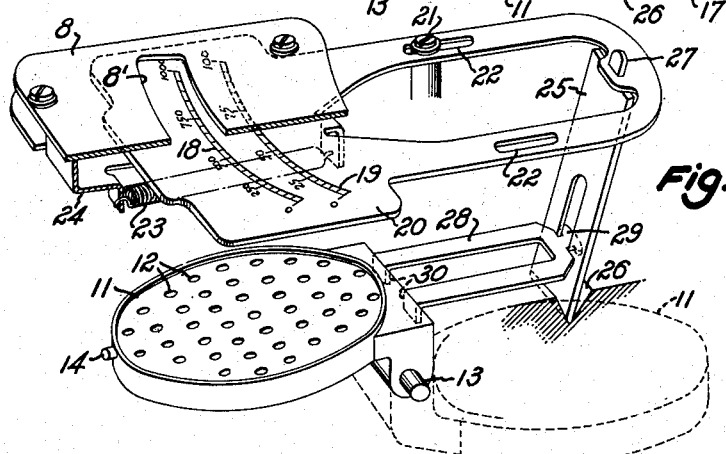
Fig. 3 is a perspective view of the auxiliary baffle and the movable scale plate.

The auxiliary baffle, as shown in Figs. 2 and 3, comprises a relatively thick plate 11 having small diameter openings 12 that are in axial alinement with the several lens elements of the lens plate 3 when the baffle plate 11 is turned about the hinge pin 13 into the operative position shown in solid lines in Fig. 2. The outer end of the plate 11 carries a latch in the form of a sliding plunger 14 having a knob 15, and a spring 16 for pressing the plunger outwardly. The plunger 14 seats in a notch in the casing 1 when the baffle plate 11 is in operative position, and may be released by means of the knob 15 when the baffle is to be turned back into inoperative position, as shown in dotted line. The knob 15 seats in a slot in plate 17 to latch the baffle plate in this position, and the plunger 14 now serves as the release member which is pressed inwardly to release the latch.

The high and low range graduated scales 18, 19, respectively, are printed or engraved on a flat plate 20 that is guided for sliding movement parallel to the longest or major axis of the casing 1 and beneath the plate 8 by screws 21 that are threaded into the magnet 5 and extend through slots 22 in the plate 20. The graduated scales 18, 19 are arcuate, as is conventional and extend substantially transverse to the major axis of the casing 1. A spring 23 is connected between the plate 20 and a fixed anchor plate 24 to urge the plate 20 into position to expose the low range graduations 19 to view through the window or transparent section 8' of the plate 8. The mechanism for displacing the graduated plate rearwardly includes a lever 25 that is pivoted in a groove 26 in casing 1 and has a tip 27 that extends through a slot in the plate 20, and a U-shaped slide 28 that is loosely interlocked to the lever 25 by the notched extension 29 that passes through a slot in the lever. The arms of the slide 28 project through guide slots in the casing 1 and terminate in bent ends 30 that lie in the path of the baffle plate 11 as it moves into operative position in front of the main baffle.

The photocell 2 is connected to the coil 6 of the measuring instrument in the usual manner and the coil 6 is mounted in the customary brackets. These details form no part of the invention and therefore are not illustrated in the drawing.

The main light-restricting system or lens plate 3 and compartment member 4 provides an acceptance angle that may be substantially larger than the average camera angle, for example an acceptance angle of from 60° to 90°. The apparatus therefore affords readable indications of low brightness values when only the main baffle is used as the cell receives light energy radiated from an area substantially larger than the picture area. The total light energy reaching the cell is substantially reduced by a selective screening off of certain of the light rays included in the large acceptance angle when the auxiliary baffle plate 11 is positioned over the main baffle members 3, 4 to increase the brightness measuring range of the exposure meter. The reduced transmission of light energy to the cell is due primarily to the geometry of the light passages 12 in the auxiliary baffle plate and not, as in prior auxiliary baffles, to the ratio of the effective cross-sections of the light ray paths of the apparatus as adjusted for low brightness range and high brightness range measurements. The light passages 12 have a large ratio of depth to diameter, and the walls of the light passages selectively screen off all light rays approaching the cell from a preselected outer portion of the acceptance angle of the main baffle 3, 4. The acceptance angle of the cell is thus reduced to a much lower value, for example to about 30°, that may include a field substantially smaller than the picture area.

Furthermore, an auxiliary baffle with light passages of the illustrated type effects a selective screening off of a part of the light rays within the smaller acceptance angle that is determined by the geometry of the light passages 12. Normal incident light rays that enter the passages 12 parallel to axes of the passages, and normal to the cell surface, pass through the passages 12 without attenuation but the walls of the passages intercept a part of all light rays, within the smaller acceptance angle, that are inclined to the axes of the passages 12. The selectivity of the meter to normal incident light rays is thus increased by the auxiliary baffle plate 11 and the effect of the inclined light rays upon the measurement of average brightness values is correspondingly reduced.

The auxiliary baffle plate 11 is moved into and out of operative position in accordance with the brightness of the scene to be photographed and the scale plate 20 is automatically displaced to display the high range scale 18 or the low range scale 19, respectively, into view beneath the window opening or transparent section 8' of the plate 8. This display of but one scale eliminates the possibility, which was present in prior devices, of an erroneous reading of the brightness value.

The method of operation of the exposure meter will be apparent from the foregoing description. When the baffle 11 is turned into operative position above the main baffle system, the plate 11 strikes the ends 30 of the slide 28 and thereby rocks the lever 25 to displace the scale plate 20 in opposition to the tension of the spring 23. Upon the movement of the plate 11 into inoperative position, the spring 23 returns the scale plate 20 into position to display the low range scale 19 when the end of the plate 11 moves away from the tips 30 of the slide 28.

It will be apparent that there is considerable latitude in the design and construction of the baffle members and the adjustable scale members. The baffle system may take the form of laterally displaceable compartment members that afford a wide acceptance angle when the openings of the compartment members are axially alined, and a lesser acceptance angle when the compartments of the members are axially displaced. The scales may comprise a single set of scale divisions printed on a transparent section 8' of the plate 8, with sets of graduations on the plate 20 for use with the single set of scale divisions. The movable scale plate is useful with auxiliary baffles of the previously known type which did not alter the acceptance angle but obstructed a portion of the cell area or otherwise rendered ineffective a portion of the light energy approaching the cell over a single fixed acceptance angle.

This application is a continuation-in-part of my copending application, Serial No. 104,120, filed October 5, 1936, for improvements in Photometers.

It is to be understood that various changes may be made in the design, construction and relative arrangement of the elements of the photometer without departing from the spirit of my invention as set forth in the following claims.

I claim:

1. In an exposure meter of the type including a computer for evaluating a measured average brightness value with selected values of other exposure factors to determine appropriate exposure data, a photoelectric cell, an instrument connected to said cell and having a pointer cooperating with a scale, and baffle means cooperating with said cell to adapt the exposure meter to the measurement of average brightness values in different ranges; said baffle means comprising light intercepting means in front of said cell to admit light rays thereto over a predetermined acceptance angle for the measurement of brightness values in a low range, and light intercepting means movable into the light path included within said acceptance angle selectively to screen off all light rays that approach the cell from a preselected outer portion of the field included within said acceptance angle, thereby substantially decreasing the effective acceptance angle of the cell for the measurement of average brightness values in a higher range.

2. In an exposure meter of the type including a computer for evaluating a measured average brightness value with selected values of other exposure factors to determine appropriate exposure data, a photoelectric cell, an instrument connected to said cell and having a pointer cooperating with a scale, and baffle means adjustable to vary the acceptance angle of the cell to adapt the exposure meter to the measurement of average brightness values in different ranges; said baffle means comprising primary light intercepting means in front of said cell to admit light rays thereto over a predetermined acceptance angle for the measurement of brightness values in a low range, and auxiliary light intercepting means movable into the light path included within said acceptance angle selectively to screen off all light rays that approach the cell from a preselected outer portion of the field included within said acceptance angle and selectively to screen off a part of the light rays approaching said cell from other portions of said field and inclined to a line normal to the cell, thereby substantially decreasing the effective acceptance angle of the cell and relatively increasing the selectivity of the meter to normal incident light rays for the measurement of average brightness values in a higher range.

3. In a double range exposure meter of the type including a computer for evaluating a measured average brightness value with selected values of other exposure factors to determine appropriate photographic exposure data, a photoelectric cell, a measuring instrument of constant sensitivity connected to said cell and having a pointer movable along a scale, and a baffle system including stationary baffle means in front of said cell to restrict the light rays reaching the cell to those approaching over a preselected and relatively wide acceptance angle, and movable baffle means adjustable into the light path of said stationary baffle means to increase the measuring range of the exposure meter, said movable baffle means including a light intercepting surface for selectively screening off all light rays that approach the cell from a preselected outer portion of the field included within the predetermined acceptance angle of the stationary baffle means.

4. In an exposure meter of the type including a computer for evaluating a measured brightness value with selected values of other exposure factors to determine appropriate exposure data, a photoelectric cell, an instrument connected to said cell and having a pointer cooperating with a scale, a casing housing said cell and instrument, and a baffle system cooperating with said cell and adjustable to determine the brightness measuring range of the exposure meter; said baffle system including stationary baffle means admitting light rays to said cell over a relatively large acceptance angle for the measurement of brightness values in a low range, and a baffle pivoted upon said casing for movement into and out of the light path included within said large acceptance angle, said pivoted baffle having a light intercepting surface for selectively screening off from said cell all light rays that approach the cell from a preselected outer portion of the relatively large acceptance angle, thereby reducing both the effective acceptance angle of the cell and the total light energy reaching the cell.

5. A double range photometer comprising a casing, a photoelectric cell and a measuring instrument within said casing, said instrument having a pointer cooperating with a scale graduated in two ranges of brightness values, means for restricting the acceptance angle of the cell to a predetermined relatively large value for which the pointer position with reference to the lower range scale indicates the average brightness of the area included within the relatively large acceptance angle, and means adjustable to reduce the acceptance angle to a lesser value and simultaneously to increase the measuring range to a value for which the pointer position with reference to the higher range scale indicates the average brightness value of the area included within the acceptance angle of lesser value; said adjustable means comprising an opaque baffle plate adjustably mounted on said casing and having a plurality of light transmitting openings therethrough, the width of said openings with respect to their length determining the smaller acceptance angle.

6. A photometer as claimed in claim 5, wherein said baffle plate is hinged to said casing for a pivotal movement into and out of operative position in front of said cell.

7. In an exposure meter, a photocell and a measuring instrument within a casing, said instrument being connected to said photocell and having a pointer cooperating with a plurality of scales graduated in different ranges of brightness values, an optical refractive system in front of said photocell for limiting the light rays reaching said photocell to an angular spread for which the pointer position with respect to the low range brightness scale indicates the average brightness of the area included within that angular spread, and a mechanical baffle pivoted upon said casing for movement into position in front of said optical refractive system to exclude from said photocell a portion of the light rays that would pass said optical refractive system, said mechanical baffle comprising a relatively thick plate having a plurality of relatively small diameter openings therethrough; the pointer position with respect to the high range brightness scale indicating, when the mechanical baffle is in operative position, the average brightness of the area from which light rays are reflected to said photocell.

8. In an exposure meter, a casing housing a photoelectric cell and an electrical measuring instrument connected to said cell, a main baffle restricting the acceptance angle of the cell to a predetermined value, one wall of said casing being recessed and said main baffle being located beneath said recessed wall, an auxiliary baffle hinged on said casing and movable into the recess of said casing wall to overlie said main baffle, thereby to effect a multiplication of the measuring range of the measuring instrument.

9. In an exposure meter, the invention as claimed in claim 8, wherein said auxiliary baffle comprises means for restricting the acceptance angle of said cell to a value substantially lower than that determined by said main baffle.

10. A double range photoelectric exposure meter comprising a casing housing a photoelectric cell and a measuring instrument connected to said cell, said instrument including a scale plate carrying graduations of two ranges of values and screening means for concealing one range of graduations, said scale plate and screening means being relatively adjustable to expose one or alternatively the other range of graduations, baffle means movable to alter the sensitivity of response of said instrument to light energy approaching the cell, and means actuated by movement of said baffle means to effect relative movement of said scale plate and screening means to expose to view that range of graduations corresponding to the adjustment of said baffle means.

11. A photoelectric exposure meter comprising a casing housing a photoelectric cell and a measuring instrument, an instrument scale plate carrying two sets of graduations of different brightness ranges, means supporting said scale plate for adjustment to present said sets of graduations alternatively into view, baffle means movable to alter the sensitivity of response of said instrument to light energy of different brightness values, and means actuated by the movement of said baffle means to displace said scale plate to expose to view that set of graduations corresponding to the adjustment of the baffle means.

12. A photoelectric exposure meter comprising a casing, a photoelectric cell and a measuring instrument within said casing, said instrument having a pivoted pointer, a baffle system restricting the acceptance angle of the cell to a predetermined value, an auxiliary baffle adjustably mounted on said casing for movement into position in front of said baffle system to reduce the light energy reaching said cell, a movable instrument scale plate carrying two sets of symbols indicative of brightness values in different brightness ranges, and means operable by said auxiliary baffle to displace said movable plate to expose to view for cooperation with said pointer that set of symbols which is appropriate for the position of the baffle.

13. A photoelectric exposure meter as claimed in claim 12, wherein said baffle comprises an apertured baffle plate pivoted upon said casing.

14. A photoelectric exposure meter as claimed in claim 12, wherein said auxiliary baffle comprises a relatively thick plate having small diameter openings therethrough for reducing the acceptance angle of the cell to a value substantially less than the acceptance angle determined by said baffle system.

15. In an exposure meter, a casing, a photocell and a measuring instrument within said casing, and baffle means for determining the acceptance angle of said cell; said baffle means comprising a light-transmitting member pivoted upon said casing, a plunger slidably mounted on said member and carrying a knob, a recess in said casing for receiving the end of said plunger in one position of said member, and means for latching said member in an alternative position of adjustment thereof, said latching means comprising a plate on said casing for engaging said knob in an alternative position of adjustment of said member.

16. In an exposure meter, a casing housing a photoelectric cell and a measuring instrument, a main baffle system for restricting the acceptance angle of the cell to a predetermined value, an auxiliary baffle hinged upon said casing and angularly movable into operative position in front of said main baffle system to effect a multiplication of the measuring range of the measuring instrument, said auxiliary baffle comprising an apertured plate having openings of such width with respect to axial length that the acceptance angle of the cell is reduced when said auxiliary baffle is moved into operative position, and cooperating means carried by said casing and auxiliary baffle for latching said auxiliary baffle in operative or alternatively in inoperative position.

17. In an exposure meter, a measuring instrument including a pointer movable over an apertured plate and also over a scale plate having two scales of different brightness values, means mounting the scale plate for sliding movement to display one or the other of said scales through the aperture of the first plate, a casing housing said measuring instrument, a photoelectric cell within said casing and connected to said measuring instrument, a main baffle system restricting the acceptance angle of the cell to a predetermined value, an auxiliary baffle hinged upon said casing and angularly movable into operative position in front of said main baffle system to effect a multiplication of the measuring range of the measuring instrument, cooperating means carried by said casing and auxiliary baffle for latching said auxiliary baffle in operative or alternatively in inoperative position, and means actuated by said auxiliary baffle to adjust said scale plate to display the low range scale when said auxiliary baffle is in inoperative position and the high range scale when said auxiliary baffle is in operative position.

18. A double range photoelectric exposure meter comprising a casing housing a photoelectric cell and a measuring instrument connected to said cell; said instrument including scale means having scales graduated in two ranges of brightness values and a screening plate for concealing one scale of graduations, said scale means including a scale plate carrying at least one of said scales, said casing having a window opening for viewing said scale means, means supporting said scale plate and said screening plate in parallel relation for relative sliding movement to expose one or alternatively the other of said scales of graduation, the screening plate being located between said window opening and said scale plate, range-change means movable to condition the exposure meter for brightness measurements in the desired measuring range, and means operable by said range-change means to produce relative sliding movement of said scale plate and said screening plate to conceal from view the graduated scale of the other measuring range.

19. A double range photoelectric exposure meter as recited in claim 18, wherein said screening plate is fixedly mounted within said casing, and said scale plate is supported for sliding movement with respect to said screening plate.

20. A double range photoelectric exposure meter as recited in claim 18, wherein said casing is of relatively flat elongated rectangular form and said window opening is in a large flat wall thereof, said screening plate is a flat plate parallel to said flat wall, said scale plate has a graduated range scale extending substantially transversely of the major axis of said casing, and said scale plate and screening plate are supported for relative sliding movement parallel to the major axis of said casing.

ALEXANDER T. WILLIAMS.